United States Patent Office 3,709,846
Patented Jan. 9, 1973

3,709,846
**TRIMELLITIC ANHYDRIDE MODIFIED POLYCAR-
BOXYLIC ACID ELECTROCOATING RESINS**
Ivan H. Tsou, Pontiac, Mich., assignor to Ford Motor
Company, Dearborn, Mich.
No Drawing. Continuation-in-part of application Ser. No.
733,187, Apr. 24, 1968, which is a continuation-in-part
of applications Ser. No. 363,814, Apr. 30, 1964, and
Ser. No. 734,825, Apr. 24, 1968, the latter being a
continuation-in-part of application Ser. No. 363,815,
Apr. 30, 1964, all now abandoned. This application
Sept. 25, 1970, Ser. No. 75,748
The portion of the term of the patent subsequent to
Apr. 20, 1988, has been disclaimed
Int. Cl. C09d 3/58, 3/64, 5/02
U.S. Cl. 260—18 EP                 10 Claims

ABSTRACT OF THE DISCLOSURE

A paint bath composition for electrodeposition of paint upon an anode, said bath comprising an aqueous dispersion of particulate pigment, a water-soluble base, and a polycarboxylic acid formed by reacting a hydroxyl bearing of hydroxyl yielding linear base compound with an olefinically unsaturated acrylic, carboxylic acid of about 18 carbon atoms and subsequently reacting the resultant resin with trimellitic anhydride.

This application is a continuation-in-part of application Ser. No. 733,187 filed Apr. 24, 1968, now abandoned which in turn is a continuation-in-part of application Ser. No. 363,814 filed Apr. 30, 1964, now abandoned and application Ser. No. 734,825 filed Apr. 24, 1968, now abandoned, which in turn is a continuation-in-part of application Ser. No. 363,815 filed Apr. 30, 1964, now abandoned.

BACKGROUND OF THE INVENTION

Electrically induced deposition of paint comprising pigment and a polycarboxylic acid resin provides an effective means for placing a coating of uniform depth upon all exposed areas of metal articles, including those having recessed or irregularly shaped surfaces. This process is exemplified in the art by Gilchrist, U.S. Pat. 3,230,162.

Large scale coating operations require that the coating materials employed in such process provide a physically and chemically stable coating bath, i.e., a bath that will permit continuous or intermittent addition of replacement feed, provide a uniform, blemish-free film, and, when applied to articles subjected to outdoor exposure, a high level of corrosion protection after conventional treatment to effect heat curing.

Preferably, the coating material for use in this process is one that requires a minimum of electrical energy to provide a film of acceptable thickness in a minimum of time upon the most inaccessible and/or electrically shielded surfaces of the workpiece. The degree to which a given coating material possesses this characteristic in relation to other coating formulations under like conditions is termed the "throw" or "throwing power" of the formulation. In many applications, it is also necessary that the coating provided be one that is compatible with conventional sanding procedures and with the application of an overcoating which may be of the same or of different composition. In others, the coating thus applied may be the sole paint application made upon the object.

THE INVENTION

This invention is concerned with novel and superior coating materials for use in the aforedescribed painting process and to a coating bath containing the same. This bath will ordinarily include a particulate pigment, a water-soluble base, preferably a water-soluble amine, although other bases such as ammonium hydroxide, potassium hydroxide, lithium hydroxide, etc., may be used, and a polycarboxylic acid binder resin.

At least the predominant fraction of the film-forming binder resin of this coating bath is a polycarboxylic acid resin having an acid number above about 20, preferably in the range of about 35 to about 75, although resins with higher acid numbers can be used, e.g., 75 to 150. This resin is prepared by reacting a polymer having essentially no crosslinking, hence a linear base compound, having a plurality of hydroxyl groups or hydroxyl yielding groups thereon with an acyclic, olefinically unsaturated, carboxylic acid of about 18 carbon atoms in an amount sufficient to effect reaction of a partial but incomplete amount of said sydroxyl groups and then reacting the resultant resin with trimellitic anhydride, the mole ratio of said anhydride to said olefinically unsaturated carboxylic acid in the resultant polycarboxylic acid resin being in the range of about 1:1 to about 1:3.

When these reactions are initiated, the linear base polymer may include these hydroxyl groups, existing as such, or in lieu thereof epoxide groups which under esterification conditions open to provide hydroxyl groups for esterification with the aforementioned acids and anhydrides. The hydroxyl is preferably situated so as to constitute a primary alcohol group and is preferably displaced from the principal carbon to carbon chain by not more than one (0 to 1) carbon atom (where the polymer consists of carbon, hydrogen and oxygen or is disposed in a functionally equivalent position when the base polymer contains atoms other than carbon, hydrogen and oxygen). For the purposes of these reactions, the linear base polymer consists essentially of carbon, hydrogen and oxygen since the only reactions involved are esterification reactions of alcohol groups with carboxyl groups (or the opening of an epoxide group followed by the esterification of alcohol groups).

Thus, while the base compound, usually a polymer, may include other elements, these elements and the groupings of which they form a part are those which do not take part in the esterification reaction or any other chemical reaction under the conditions necessary to carry out the esterification reaction.

Advantageously, the base compound has about 2 to about 10, preferably an average of about 3 to about 7, free and dissociable hydroxyl groups per molecule.

Thus, the starting resin may be a suitably formulated alkyd resin, e.g., from phthalic anhydride, trimethylol ethane and a fatty acid, a copolymer of acrylate monomers, e.g., methyl methacrylate, ethyl acrylate, butyl acrylate, butyl methacrylate, hexyl acrylate, 2-ethyl hexyl acrylate, etc., wherein one constituent monomer is a hydroxyalkyl acrylate, e.g., hydroxyethyl methacrylate, hydroxyethyl acrylate, hydroxypropyl methacrylate, hydroxypropyl acrylate, etc., a melamineformaldehyde resin, a phenol-formaldehyde resin (resole), a polyurethane, a vinyl alcohol homopolymer or copolymer, a styrene-allyl alcohol copolymer, an epoxy resin, e.g., Bisphenol A-epichlorohydrin type, which may be termed a hydroxyl yielding resin in that under esterification conditions the epoxide linkage breaks to yield hydroxyl, and others.

When the starting resin is an epoxy resin, the polyepoxide (2 or more epoxide groups per molecule), has a molecular weight in excess of about 350, e.g., in the range of about 350 to about 5,000. Terminal epoxide groups open to provide a primary alcohol group which can be reacted with the fatty acid reactant and a secondary alcohol group which though less reactive can be reacted with the readily reactable anhydride group of the trimellitic anhydride. An excess of the fatty acid, preferably about 15 mole percent, is used to push the reaction of primary alcohol groups to essential completion. It is advantageous to leave a small amount of unreacted fatty acid in the reaction mixture. This will form an amine soap with the amine solubilizer and assist in the dispersion of the resin in the aqueous coating bath.

The mole ratio of fatty acid to epoxide groups in the resin will be about 1:1 and will not exceed 1:1. The mole ratio of fatty acid to epoxide group will not exceed 1:1 and may range from 1:1 to about 1:3. In the case of diepoxides from 1:1 to 1:2. Suitable epoxy base polymers are described in U.S. Pats. 2,637,621; 2,970,983; 3,012,979; 3,062,770; and 3,230,162, as well as in a variety of other publications as are the other resin types suitable for this purpose. See, for example, Modern Surface Coatings, Paul Nylene and Edward Sunderland, Interscience Publishers, a division of John Wiley & Sons, Ltd., London, New York, Sydney, copyright 1965 (acrylic resins 238, alkyd resins 151, epoxide resins 197, melamine-formaldehyde resins 193, resoles 179, urea-formaldehyde resins 190, and polyurethanes 209).

The $C_{18}$ olefinically unsaturated, monocarboxylic acids existing in or derived from products of nature are plentiful and suitable for this purpose, i.e., fatty acids derived from linseed oil, soya bean oil, hempseed oil, walnut seed oil, perilla oil, castor oil, sardine oil, menhaden oil, etc. Particularly suitable are the drying oil fatty acids obtained as a mixture of individual acids by hydrolysis of natural drying oils such as linseed oil, soya bean oil, perilla oil and the like. Also, the unsaturated fatty acids obtained by hydrolysis of drying oils which have been treated so as to effect conjugation of the double bonds, as by alkali isomerization, are very suitable for particle esterification of the polyhydroxylated resins. The quantity of such acids reacted with the hydroxyl bearing (or hydroxyl yielding) base polymer is limited to an amount that leaves a desired amount of hydroxyl groups on the base polymer unreacted for use in the second reaction step. Obviously, with variance of the hydroxyl content in the base polymer as aforedescribed, there will be some variance in the amount of $C_{18}$ acid which can be reacted with the base polymer.

As in the case of the diepoxide or polyepoxide, the fatty acid is easily reacted with the primary alcohol groups. The anhydride group of the trimellitic anhydride can be reacted with secondary alcohol groups or primary alcohol groups left intact as when a lesser amount of fatty acid is employed. This will, of course, be determined in advance after the base polymer has been chosen. The amount of remaining hydroxy will be such to afford the final product with the desired acid number, particularly where the carboxyl groups contributed by the trimellitic anhydride are to be the sole source of carboxyl functionality in such product. As aforementioned, the mole ratio of the anhydride to the olefinically unsaturated, $C_{18}$ carboxylic acid in the final product resin will be controlled within the range of 1:1 to about 1:3.

The reaction of the olefinically unsaturated, monocarboxylic acids with hydroxyl (or epoxy) groups of the base polymer is a conventional esterification reaction and advantageously is carried out at a temperature in the range of about 400° to 450° F. or slightly higher. The reaction of the anhydride with remaining hydroxyl groups on the base polymer is advantageously carried out at a temperature in the range of about 320° to 350° F., preferably at about 330° F. It will be understood by those skilled in the art that the polycarboxylic acid resin may also have dissociable monocarboxylic acid groups in its molecular structure other than those contributed by the trimellitic anhydride. However, in the resins of this invention, the major proportion of the resin's acidity is provided by the dicarboxylic acid groups provided by reaction of the trimellitic anhydride with the hydroxyl bearing base polymer.

Electrically induced deposition from an aqueous coating bath using the aforedescribed polycarboxylic acid resin is facilitated by exceptionally high throwing power. The coatings obtained from these resins afford the article coated high corrosion resistance, as measured by conventional salt spray testing. The two closely associated free carboxyl groups per acid molecule in these resins appears to account for their evidencing high chemical stability in both the coating bath and the deposited film. This permits their effective use in coating baths of greater basicity and reduces the requirements of pH control.

These resins may be admixed with conventional pigments, fillers, extenders, polymerizable monomers, etc. The resultant coating formulations are dispersed in the aqueous bath in amounts such as to provide about 2 to 20, preferably about 5 to 12 percent solids. They are effectively dispersed with conventional dispersal assistants for polycarboxylic acid resin, e.g., ammonia, ethanolamine, diethylamine, diethanolamine, triethanolamine, isopropanolamine, diisopropanolamine, hydroxylamine, morpholine, N-methyl ethanolamine, etc., nonvolatile bases, e.g., potassium hydroxide, lithium hydroxide, etc., obviously can be used but the organic bases are preferred.

This invention will be more fully understood from the following illustrative examples:

EXAMPLE 1

An electrocoating paint is prepared in the following manner:

Step 1.—A resin comprising a copolymer of styrene and allyl alcohol is admixed with soya fatty acids in a mole ratio of about 1:3, heated to 430° F. and maintained at this temperature until the acid number of the resulting polyester resin is about 2.5. The above referred to copolymer is further characterized as having an acid number of less than 0.5, a hydroxy content of about 5.4–6.0 percent, a specific viscosity of about 0.61–0.75, a specific gravity of 1.083 and a molecular weight of about 1600.

Step 2.—The resin prepared in Step 1 is cooled to 330° F. and 1 mole of trimellitic anhydride, the 1,2-anhydride of 1,2,4-benzene tricarboxylic acid, is added per each mole of the original copolymer.

Step 3.—The temperature is returned to 330° F. and maintained until the acid number of the resulting resin is about 40.

Step 4.—Methyl ethyl ketone, hereinafter referred to as MEK, is added to the resin of Step 3 in the amount of 1 part by weight per each four parts of resin.

Step 5.—The following materials are admixed and ground to a fineness of 6 Hegman:

| | Lbs. |
|---|---|
| Red iron oxide | 552 |
| Basic lead chromate coated silicate | 227 |
| China clay | 824 |
| Resin-MEK from Step 4 | 2,000 |

Step 6.—To the material prepared in Step 5 are blended 4,366 lbs. of the resin-MEK from Step 4 and 600 lbs. MEK.

Step 7.—An aqueous emulsion is prepared by admixing 3,340 lbs. of the material prepared in Step 6, 216 lbs. of triisopropanolamine and 5,064 lbs. deionized water and passing this mixture through a sonic type homogenizer.

An electrocoating bath having a pH of 7.2 and containing 6.7 percent paint solids is prepared by diluting the above-described emulsion with deionized water. Electrically induced deposition of the emulsified paint is carried on within a steel coating tank which is grounded and serves as the cathode of the electrodeposition cell. Steel panels immersed in the bath are electrically charged and serve as anodes of the cell. Coating is carried out at 65° F. at a potential of 350 volts. A uniform deposit of about 0.9 mil in thickness is obtained in about 1 minute and the workpieces are removed from the bath. The coated panels are subsequently baked for 15 minutes at 380° F. The panels are then subjected to salt spray in accordance with A.S.T.M. test procedure #B117 and satisfactorily withstand 250 hours exposure.

The throwing power of coating material thus prepared is tested by a triple leaf coating test. This test is carried out using a device formed by riveting together three rectangular mild steel sheets with a single rivet. The steel sheets each measured 3" x 8" and are fitted together in a manner so that, from a side view, the central rectangle is protected by two leaves diverging about 0.25" maximum from the riveted base. The amount of area coated on the center leaf is a measure of the throw of the formulation under the conditions employed. In a series of paints made in this manner, about 85 percent of the central leaf is coated to a depth of approximately 1 mil within 1 minute after the application of such voltage denoting exceptionally high throwing power.

The current consumption measured for deposit of these paints is quite low, i.e., about 30 coulombs per gram with baths solids concentration as low as 3 weight percent.

EXAMPLE 2

An electrocoating paint is prepared in the following manner:

Step 1.—The procedure of Steps 1-3 of Example 1 are repeated using 16,000 lbs. of the styrene-allyl alcohol copolymer of Example 1, 8,430 lbs. tall oil fatty acids and 1,920 lbs. of trimellitic anhydride.

Step 2.—To the resin prepared in Step 1 are added 2,800 lbs. MEK, 1,434 lbs. pine oil and 1,434 lbs. of an aromatic hydrocarbon solvent characterized as follows: boiling range 369° to 406° F., specific gravity 0.892, mixed aniline point 65° F. and kauri-butanol value 92.1.

Step 3.—The following materials are admixed and ground to a fineness of 6 Hegman:

| | Lbs. |
|---|---|
| Red iron oxide | 200 |
| Basic lead chromate coated silicate | 100 |
| China clay | 300 |
| Resin material prepared in Step 2 | 700 |
| MEK | 113 |

Step 4.—To the material prepared in Step 3 are blended 1,545 lbs. of the resin material prepared in Step 2 and 336 lbs. MEK.

Step 5.—An aqueous emulsion is prepared by admixing 1,572 lbs. of the material prepared in Step 4, 139 lbs. triisopropanolamine, and 2,386 lbs. deionized water and passing this mixture through a sonic type homogenizer.

One part of this emulsion is diluted with seven parts deionized water and to a pH of 7.78. Coating is carried out in a deposition cell upon a 4" x 12" mild steel panel which serves as the anode and is positioned so as to present one major face of the panel to a single cathode. A potential of 400 volts is applied for 1 minute. The panel is removed from the bath and examined. The appearance of the deposited film is smooth. The thickness of the deposited film is 1.2 mils on the side facing the cathode and 1.0 mil on the side opposite. This panel is baked for 10 minutes at 350° F. and another panel coated in like manner is baked for 20 minutes at the same temperature. These panels are subjected to a salt spray test in accordance with A.S.T.M. test procedure #B117 and both satisfactory withstand 250 hours exposure.

Other panels prepared in like manner are subjected to and pass a 500-hour water soak test at 90° F. In this test, the panels are completely submerged in deionized water maintained at the temperature above indicated. The water is constantly replaced with more deionized water throughout the test period. The coated area satisfies the requirements of this test in that the coating does not undergo color change, loss of adhesion, or blistering and rust does not appear in the coated area.

EXAMPLE 3

The procedure of Example 1 is repeated except that for the copolymer of styrene and allyl alcohol there is substituted a partially hydrolyzed polyvinyl acetate which has been hydrolyzed under conditions to provide an average of about 5 to 7 hydroxyl groups per molecule.

EXAMPLE 4

An electrocoating paint is prepared in the following manner:

Step 1.—1,893 lbs. of tall oil fatty acids (a mixture containing 98.9 percent tall oil acids and 0.5 percent rosin acids, acid number 199, saponification number 200, viscosity Gardner sec. 0.9, unsaponifiables 0.6) are charged to a vessel and heated to 150° F.

Step 2.—To the heated acids are added 1 lb. sodium benzoate.

Step 3.—To the resulting mixture are added 1,509 lbs. of an epoxy resin (glycidyl ether of bisphenol A, visc. cps. at 25° C. 7,000–9,000 epoxy equivalent 185–195, i.e., grams of resin containing 1 gram-equivalent of epoxide).

Step 4.—The resulting material is heated to 500° F. and for a time sufficient to provide an acid number of less than about 0.2.

Step 5.—The resulting material is cooled to 330° F. and 527 lbs. of the anhydride of 1,2,4-benzene tricarboxylic acid are added and the temperature is maintained at 330° F. until the resulting resin has an acid number of 62.

Step 6.—To this resin at 330° F. are added 974 lbs. of methyl ethyl ketone and the mixture was allowed to cool first.

Step 7.—44 lbs. of the solution of resin-methyl ethyl ketone from the preceding step and 3.2 lbs. of black iron oxide are admixed and ground for 16 hours after which 30 additional lbs. of the resin-methyl ethyl ketone material of the preceding step are added and the resultant mixture is ground for an additional hour.

Step 8.—To a sonic type homogenizer containing 47.6 lbs. deionized water, 0.3 lb. triisopropanolamine, and 1.1 lbs, diethylamine, are added 25 lbs. of the material prepared in the preceding step and 5 lbs. methyl ethyl ketone. This material is agitated until fully emulsified and the solvent removed. Specifically, the temperature of the emulsion is raised to about 150° F. to vaporize the methyl ethyl ketone. The vaporized solvent is then removed by reducing the pressure above the oil-in-water type emulsion to about 50 mm. Hg with a conventional vacuum pump.

A 600 gallon electrocoating bath having a pH of 8.25 and containing 5.2 weight percent paint solids is prepared by diluting this emulsion with additional deionized water. Electrically induced deposition of the paint is carried on wthin a 700 gallon coating tank which is grounded and serves as the cathode of the electrodeposition cell. Steel panels immersed in the bath are electrically charged and serve as anodes of the cell. Coating is carried out at 74° F. at a potential of 350 volts. A uniform deposit approximately 0.75 mil. in thickness is obtained and at this point the workpieces are removed from the bath and subsequently baked for 25 minutes at 360° F. The film obtained is characterized as smooth. The panels are then subjected to salt spray in accordance with A.S.T.M. test procedure #B117 and satisfactorily withstand 225 hours exposure.

EXAMPLE 5

A bath is prepared in the manner of Example 4 having a pH of 8.0 and containing 5.3 weight percent solids. Electrically induced deposition is carried out in the manner of the preceding example until a 0.7 mil film is obtained. The baked panels withstand 225 hours salt spray in accordance with the test procedure identified in Example 4.

EXAMPLE 6

An electrocoating bath is prepared from an emulsion prepared as in Example 4 except that the bath contains 5.95 weight percent solids and has a pH of 7.9. Coating and baking are carried out as in the preceding examples. A prebaked coating of 0.6 mil passes a 225-hour salt spray test as in the previous examples.

EXAMPLE 7

An electrocoating bath is prepared as in Example 4 using 150 gallons of the emulsion and 500 gallons of deionized water. The resultant bath contains 5.8 weight percent paint solids. Coating is carried out as before at 78° F. and 350 volts. A smooth film is formed upon the metal workpieces which measures 0.7 mil in depth.

In order to test the throwing power of the formulation, a triple leaf coating test is carried out. The test is carried out using a device formed by riveting together three rectangular mild steel sheets with a single rivet. The steel sheets each measure 3" x 8" and are fitted together in a manner so that, from a side view, the central rectangle is protected by two leaves diverging about 0.25" maximum from the riveted base. The amount of area coated on the center leaf is a measure of the "throw" of the formulation under the conditions employed. With this formulation, 85 percent of the central leaf is coated to a thickness of approximately 1 mil within 1 minute after application of such voltage denoting exceptionally high throwing power.

EXAMPLE 8

A resin is prepared as in Steps 1-5 of Example 4. A mixture is formed of the following materials:

| | Lbs. |
|---|---|
| China clay | 48.30 |
| Black iron oxide | 5.60 |
| Barium sulfate | 26.75 |
| Basic lead chromate | 15.90 |
| Resin (above) | 370.00 |
| Methyl ethyl ketone | 32.00 |

This mixture is ground in a pebble ball mill for 24 hours to Hegman gauge 6. To the resulting material are added the following materials:

| | Lbs. |
|---|---|
| Diethylamine | 20.9 |
| Triisopropanolamine | 5.0 |
| Water | 842.0 |

This mixture is ground as before for 20 hours. This coating material is then processed as in Step 8 of Example 4 to remove the methyl ethyl ketone.

An electrocoating bath is prepared with this material diluted with deionized water to a paint solid content of 6 weight percent. Panels 4" x 12" are coated in this bath at 225 volts. After a current flow of about 5 amperes a coating of about 0.7–0.8 mil is obtained. The panels are baked at 360° F. for 20 minutes. The panels are subjected to the same salt spray test as in the preceding examples and successfully withstands 7 days of such exposure.

EXAMPLE 9

An electrocoating paint is prepared in the following manner:

Step 1.—1,893 lbs. of tall oil fatty acids are charged to a vessel and heated to 150° F.

Step 2.—To the heated acids are added 1 lb. sodium benzoate.

Step 3.—To the resulting mixture are added 1,509 lbs. of an epoxy resin, a copolymer of Bisphenol A and epichlorohydrin having an average molecular weight of about 400.

Step 4.—The resulting material is heated to 500° F. under a $CO_2$ blanket using a xylene reflux for a time sufficient to provide an acid number of less than 1.

Step 5.—The resulting material is cooled to 330° F. and 527 lbs. of the 1, 2-anhydride of 1, 2, 4-benzene tricarboxylic acid are added and the temperature maintained at 330° F. until the resulting resin has an acid number of about 62.

Step 6.—The resin is allowed to cool and 974 lbs. of methyl ethyl ketone are added.

Step 7.—1,000 lbs. of the resin-methyl ethyl ketone from the preceding step, 194 lbs. of black iron oxide and 141 lbs. of an aromatic hydrocarbon solvent are admixed and ground to a fineness of about 6 Hegman. The aromatic solvent is characterized as follows: boiling range 369° to 406° F., specific gravity 0.892, mixed aniline point 65° F. and Kauri butanol value 92.1.

Step 8.—5 lbs. carbon black, 4 lbs. of the aromatic hydrocarbon solvent employed in Step 7 and 61 lbs. of the resin-MEK from Step 6 are added to the material prepared in Step 7 and the combined mixtures are ground for an additional 2 hours in a pebble mill.

Step 9.—To the material prepared in Step 8 are added 1,262 lbs. of the resin-MEK of Step 6. This mix is ground for an additional hour.

Step 10.—An emulsion is prepared and the MEK removed as in Step 8 of Example 1 using 2,423 lbs. of the material prepared in Step 9, 114 lbs. diethylamine and 4,279 lbs. of deionized water.

The emulsion thus prepared is diluted as in the preceding examples to form a coating bath. A coating of this material is applied to steel workpieces by electrically induced deposition as aforedescribed. A film 1.0 mil in thickness is obtained which upon baking provides a smooth blemish-free coating. The aromatic solvent employed in relatively low concentrations tends to enhance the flow characteristics of the coating material where the baking temperature is below the boiling point of the solvent.

EXAMPLE 10

An electrocoating paint is prepared as in Example 1 except that the base resin is an epoxy resin having an epoxy equivalent in the range of about 400 to about 600.

EXAMPLE 11

An electrocoating paint is prepared as in Example 1 except that the base resin is an epoxy resin having an epoxy equivalent in the range of about 2,000 to about 2,500.

EXAMPLE 12

A polyurethane paint binder resin is prepared from the following materials using the procedure hereinafter set forth:

| Materials | Mols | Parts by weight |
|---|---|---|
| Toluene diisocyanate | 2 | 350 |
| Dipropylene glycol | 1 | 135 |
| Glycerine | 2 | 200 |

Procedure

The diisocyanate is charged to a stainless steel vessel equipped with reflux condenser, agitator, means for heating and cooling, a nitrogen inlet and charged with an inert atmosphere (dry nitrogen).

The diisocyanate is heated to about 40°–75° C. (100°–165° F.), preferably 40° C. or slightly above, and the dipropylene glycol is added to the stirred diisocyanate at a rate such that the temperature of the reaction mixture stays below 75° C. (165° F.). During this reaction, the temperature of the reaction mixture is maintained below 75° C. by external cooling and the rate of addition.

When the addition of the glycol is complete, the temperature is maintained at 75° C. for an additional 3 hours to assure completion of the reaction.

After the 3 hour period, the glycerine is added to the reaction mix using the same procedure and conditions used in the addition of glycol. After addition of the glycerine is complete, the temperature is again maintained at 75° C. for 3 hours to assure completion of the reaction.

One (1) mole of trimellitic anhydride is added to the reaction mixture and the reaction mixture is heated to 165° C. (330° F.). This temperature is maintained until an acid number of about 65 is reached. This resin is cooled by slowly charging isopropyl alcohol through the reflux condenser. An organic solvent is conventionally employed with the acid resin in the coating bath and the addition of this solvent, in this instance isopropyl alcohol, at this time facilitates further handling. The concentration of this solvent should not exceed 30 weight percent of the resin. This resin solution and diisopropanol amine are dispersed in water to provide a coating bath containing about 6 percent resin solids and having a pH of about 8.6. This resin is anodically deposited as in the preceding examples.

EXAMPLE 13

The procedure of Example 12 is repeated except for the differences that 2 moles of trimellitic anhydride are employed and the resin is cooked to an acid number of about 92.

EXAMPLE 14

The procedure of Example 12 is repeated except for the differences that ½ mole of trimellitic anhydride is employed and the resin is cooked to a corresponding acid number.

EXAMPLE 15

The procedure of Example 12 is repeated except for the differences that the glycol is neopentyl glycol, the diisocyanate is 4,4'-diphenylmethane diisocyanate, and the triol is 1,2,6-hexane triol.

EXAMPLE 16

The procedure of Example 12 is repeated except for the differences that the dipropylene glycol is replaced with an equimolar amount of hexamethylene glycol, the toluene diisocyanate is replaced with an equimolar amount of 1-ethyl-2,4-phenylene diisocyanate, and the glycerine is replaced with an equimolar amount of diethylene glycol.

EXAMPLE 17

The procedure of Example 12 is repeated with the differences that the dipropylene glycol is replaced with an equimolar amount of 1,5-pentanediol, the toluene diisocyanate is replaced with an equimolar amount of 1-phenoxy-2,4-phenylene diisocyanate, and the glycerine is replaced with an equimolar amount of tetraethylene glycol.

EXAMPLE 18

A polyurethane paint binder resin is prepared from the following materials using the procedure hereinafter set forth:

| Materials | Mols | Grams |
| --- | --- | --- |
| Toluene diisocyanate | 2 | 350 |
| Glycerine | 3 | 300 |
| Soya fatty acids | 1 | 240 |

Procedure

About 1 mole of glycerin (100 g.) and the soya fatty acids are charged to a stainless steel vessel equipped as in Example 12. This mix is heated to about 230° C. (446° F.) and maintained at this temperature until the acid number is below about 1. The reaction mix is cooled to about 40° C. To the reaction mix are slowly added 2 moles of toluene diisocyanate and the reaction mix is maintained at about 50°–60° C. by the rate of addition and external cooling until the addition is complete. When addition is complete, the temperature is taken up to 75° C. and held there for 3 hours to assure completion of the reaction.

After the 3 hour period, 2 moles of glycerine are added to the reaction mix (this component may also be a glycol) using the same procedure used in the addition of the diisocyanate to the glycerine fatty acid esterification product. Again, the temperature is maintained at 75° C. for 3 hours after the addition is complete.

After this 3 hour period, one mole of trimellitic anhydride is added to the reaction mixture and the reaction mixture is heated to 165° C. (330° F.) and this temperature is maintained until the acid number is about 52. Isopropanol or other organic solvents conventional to electrodeposition of paint can be added at this point as in Example 12. This resin is dispersed in water with diethanolamine to provide a dispersion containing about 6 percent resin solids and a pH of about 8.5.

EXAMPLE 19

The procedures of Example 18 are repeated except for the difference that there are substituted 2 molar parts of diethyleneglycol for the two molar parts of glycerine which are reacted with the glycerine-fatty acid-diisocyanate reaction product.

The resin of this dispersion is anodically deposited upon metal objects as in the preceding examples.

The term "polycarboxylic acid resin" as employed herein means an organic resin having dissociable carboxyl groups in its molecular structure.

It will be understood by those skilled in the art that modifications can be made within the foregoing examples within the scope of this invention as hereinbefore described and hereinafter claimed.

We claim:
1. In a bath composition for electrodepositing paint upon an anode and comprising on a pigment and particulate filler-free basis an aqueous dispersion of a film-forming polycarboxylic acid paint binder resin at least partially neutralized with a water-soluble base, the improvement wherein said polycarboxylic acid paint binder resin is formed by reacting an acyclic, olefinically-unsaturated, monocarboxylic, fatty acid of about 18 carbon atoms with a linear compound consisting essentially of the elements of carbon, hydrogen and oxygen and having 2 to about 10 functional groups per molecule, said functional groups being selected from the group consisting of hydroxyl groups and hydroxyl-yielding epoxide groups, and subsequently reacting the resultant esterified hydroxyl group containing resin with trimellitic anhydride, the mole ratio of said fatty acid to said functional groups being in the range of 1:1 to about 1:3 and the mole ratio of said anhydride to said fatty acid in the resultant polycarboxylic acid resin being in the range of about 1:1 to about 1:3.

2. A bath composition in accordance with claim 1 wherein said hydroxyl groups are primary alcohol groups.

3. A bath composition in accordance with claim 1 wherein said linear compound has about 3 to about 7 hydroxyl groups.

4. In a bath composition for electrodepositing paint upon an anode and comprising on a pigment and particulate filler-free basis an aqueous dispersion of a film-forming, polycarboxylic acid paint binder resin at least partially neutralized with a water-soluble base, the improvement wherein said polycarboxylic acid paint binder resin is formed by reacting an acyclic, olefinically-unsaturated, monocarboxylic fatty acid of about 18 carbon atoms with a linear epoxy-functional compound consisting essentially of carbon, hydrogen and oxygen and having at least two epoxide groups per molecule and subsequently reacting the resultant esterified, hydroxyl group-containing resin with trimellitic anhydride, the mole ratio of said monocarboxylic fatty acid to said epoxide groups being in the range of 1:1 to about 1:3 and the mole ratio of said anhydride to said fatty acid in the resultant polycarboxylic acid resin being in the range of about 1:1 to about 1:3.

5. A bath composition in accordance with claim 4 wherein said linear epoxy-functional compound is a di-epoxide and the mole ratio of said fatty acid to said epoxide group is about 1:2.

6. A bath composition in accordance with claim 4 wherein said water-soluble base is a water-soluble amine.

7. In a bath composition for electrodepositing paint upon an anode and comprising on a pigment and particulate filler-free basis an aqueous dispersion of a film-forming, polycarboxylic acid paint binder resin at least partially neutralized with a water-soluble base, the improvement wherein said polycarboxylic acid paint binder is formed by reacting an acyclic, olefinically unsaturated, monocarboxylic, fatty acid of about 18 carbon atoms with a linear polymer consisting essentially of the elements of carbon, hydrogen and oxygen and having 2 to about 10 hydroxyl groups per molecule and subsequently reacting the resultant esterified, hydroxyl group-containing resin with trimellitic anhydride, the mole ratio of said anhydride to said esterified, hydroxyl group-containing resin being in the range of about 1:1 to about 1:3.

8. A bath composition in accordance with claim 7 wherein said linear polymer is a copolymer of styrene and allyl alcohol.

9. A bath composition in accordance with claim 7 wherein said water-soluble base in a water-soluble amine.

10. A bath composition in accordance with claim 7 wherein said hydroxyl groups are primary alcohol groups.

References Cited

UNITED STATES PATENTS

| | | | |
|---|---|---|---|
| 3,223,666 | 12/1965 | Bolton | 260—29.2 |
| 3,230,162 | 1/1966 | Gilchrist | 204—181 |
| 3,040,000 | 6/1962 | Stephens et al. | 260—77 |
| 3,053,783 | 9/1962 | Broadhead et al. | 260—29.2 |
| 3,558,536 | 1/1971 | Sekmakas | 260—23 |

FOREIGN PATENTS

| | | | |
|---|---|---|---|
| 6,409,137 | 2/1966 | Netherlands | 260—22 |

OTHER REFERENCES

"Technology of Paint, Varnishes, and Lacquers," by Martens, pp. 41–42 TP 935 M 28.

DONALD E. CZAJA, Primary Examiner

E. C. RZUCIDLO, Assistant Examiner

U.S. Cl. X.R.

204—181; 260—18 R, 22 R, 22 EP, 22 EP, 29.2 E, 29.6 H